(12) United States Patent
Ben-David et al.

(10) Patent No.: US 8,634,639 B2
(45) Date of Patent: Jan. 21, 2014

(54) ZERO PASS JPEG BIT RATE CONTROLLER

(75) Inventors: Gal Ben-David, Adi (IL); Victor Pinto, Zychron Yaakov (IL); Itsik Dvir, Haifa (IL); Yonatan Simson, Ramat-Gan (IL)

(73) Assignee: CSR Technology Inc., San Jose, CA (US)

( * ) Notice: Subject to any disclaimer, the term of this patent is extended or adjusted under 35 U.S.C. 154(b) by 15 days.

(21) Appl. No.: 13/540,440

(22) Filed: Jul. 2, 2012

(65) Prior Publication Data
US 2013/0034300 A1 Feb. 7, 2013

Related U.S. Application Data

(60) Provisional application No. 61/514,784, filed on Aug. 3, 2011.

(51) Int. Cl.
*G06K 9/00* (2006.01)
*G06K 9/36* (2006.01)

(52) U.S. Cl.
USPC .......................................... 382/166; 382/232

(58) Field of Classification Search
USPC .......................... 382/162, 166, 232, 240, 251
See application file for complete search history.

(56) References Cited

U.S. PATENT DOCUMENTS 5,594,554 A    1/1997    Farkash et al.

FOREIGN PATENT DOCUMENTS

EP    1107610 A1    6/2001

OTHER PUBLICATIONS

"Cluster Analysis," Wikipedia, the free encyclopedia, last updated Mar. 30, 2012, 15 pages http://en.wikipedia.org/w/index.php?title=Cluster_analysis&printable=yes.
"JPEG," Wikipedia, the free encyclopedia, last updated Mar. 23, 2012, 30 pages http://en.wikipedia.org/w/index.php?title=JPEG&printable=yes.
"Understanding Rate Control," IndigoVision, Nov. 6, 2008, 19 pages.
GB Search Report for GB Patent Application No. 1213792.3, dated Dec. 20, 2012.

*Primary Examiner* — Duy M Dang
(74) *Attorney, Agent, or Firm* — Frommer Lawrence & Haug LLP; Jamie L. Wiegand

(57) ABSTRACT

Embodiments are directed towards compressing an image to substantially a preset file size using statistical information obtained from a single subset of the image and an initial compression of the single subset. A representative subset portion of the image is selected based in part on a clustering analysis of the image. The representative subset is then compressed, in one embodiment, twice, in order to obtain statistics useable for the entire image. A scale factor is then determined that may be used in the quantization and for creating a Bit Rate Control (BRC) curve that represents an amount of accumulated bits per Minimal Codec Unit (MCU). During the compression process, the BRC curve is used to prevent accumulating bits from over shooting a final preset file size target.

21 Claims, 12 Drawing Sheets

*Scale Factor LUT for Default Quantization Matrix*

|  | BPP | | | | | | |
|---|---|---|---|---|---|---|---|
|  | .17 | .26 | .41 | .64 | .98 | 1.53 | ... |
| 688 | 1540 | 384 | 96 | 40 | 12 | 3 | ... |
| 943 | 1640 | 530 | 110 | 55 | 17 | 6 | ... |
| 1294 | 1823 | 630 | 105 | 61 | 24 | 9 | ... |
| 1776 | 2045 | ... | | | | | |
| . | . | | | | | | |
| . | . | | | | | | |
| . | . | | | | | | |

*Sum of AC Activity* (row labels)

ZERO PASS JPEG BIT RATE CONTROLLER

CROSS-REFERENCE TO RELATED APPLICATION

This application is a utility patent application based on previously filed U.S. Provisional Patent Application, Ser. No. 61/514,784 filed on Aug. 3, 2011, the benefit of which is hereby claimed under 35 U.S.C. §119(e) and incorporated herein by reference.

TECHNICAL FIELD

The present embodiments relate generally to image compression and, more particularly, but not exclusively, to compressing an image to substantially a preset file size using statistical information obtained from a single subset of the image and an initial compression of the single subset.

BACKGROUND

In the digital world, JPEG is a commonly used method for compressing and storing digital images. The term "JPEG" stands for Joint Photographic Experts Group, and is the name of a standards committee that created the JPEG standard, among other standards. The JPEG standard defines how an image is compressed into a stream of bytes and decompressed back into an image. The standard enables a user to adjust the degree of compression of an image, and thereby allows for a selectable tradeoff between storage size for the compressed image, and the resulting image's quality when subsequently uncompressed.

However, many computing systems may be constrained in a size of storage space that may be allocated to storing images. Thus, the JPEG compression method appears to be a desirable method to use. However, current implementations of the JPEG compression algorithms often require the user to encode, or compress, an image a plurality of times in order to first obtain an estimate of a scale factor or quantization value that may then be used to obtain a desired preset target size of the compressed image. If the size of the compressed image exceeds the preset target size, then further compressions of the image may be required. Should the resulting size of the compressed image significantly undershoot the preset target size, then further compressions may again be required. This may be the case, for example, where underutilizing storage size may result in wasting space that might not be useable for storing other compressed images.

Moreover, because the quantization factor which is defined by the JPEG standard is fixed for the entire image and do not provide for bit rate control during the compression of the image. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION OF THE EMBODIMENTS

Figure 1:
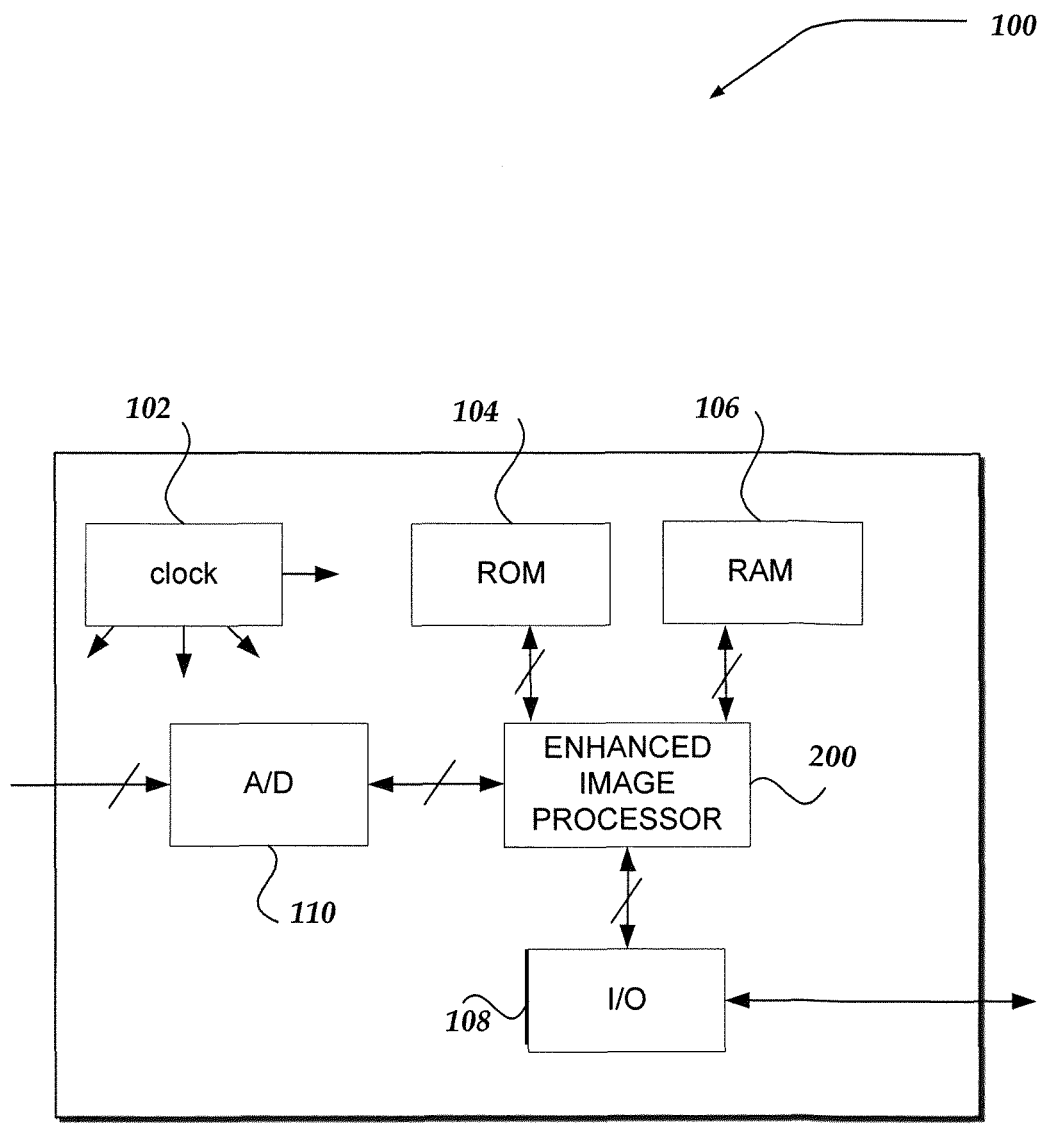
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video frames which may be spaced in time.

As used herein, the term "quantizer" refers to a value or values useable for modifying, such as by scaling, a transformation of an input image or portion of an input image. For example, where the transformation of the input image is represented as coefficients obtained from a discrete cosine transform (DCT), the modification of the transformation may include dividing a coefficient obtained from the DCT by the quantizer or scaling factor. In one embodiment, a result of the division may further be rounded to a nearest integer value.

As used herein, the term "bit rate" refers to an amount of data produced by a compression method or encoder per a selected unit. In one embodiment, the selected unit may be time. Thus, a bit rate may be expressed in units of kilo-bits per second, kbps; however, other units may also be used. For example, bit rate may also be determined over a number of slices of an image, or the like.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards compressing an image to substantially a preset file size using statistical information obtained from a single subset of the image and an initial compression of the single subset. A representative subset portion of the image is selected based in part on a clustering analysis of the image. The representative subset is then compressed, in one embodiment, twice, in order to obtain statistics useable for the entire image. A scale factor is then determined that may be used in the quantization and for creating a Bit Rate Control (BRC) curve. The BRC curve represents an amount of accumulated bits per Minimal Codec Unit (MCU) or slice. During the compression (sometimes called encoding) process, the BRC curve is used to prevent accumulating bits from over shooting a final preset file size target. In one embodiment, the disclosure below is applied using a JPEG compression; however, other compression algorithms may also be employed. For example, the embodiments disclosed below may be applied to virtually any other compression method where a same scaling factor or quantizer is employed for the entire image.

In addition, while the disclosure below discusses a single image as the input, other inputs may also be used, including, for example, a sequence of images or sequence of frames of an image, such as a video sequence, or the like.

By employing the disclosed zero pass JPEG compression with a BRC curve, it is anticipated that compression time may be reduced as multiple compressions of the entire image to obtain the preset file size is eliminated. As discussed below, this may be achieved at least in part, because the scale factor is estimated based on compression of a subset of the image, the BRC curve is created from statistics obtained from the subset of the image, and the bit rate control using the BRC curve may be applied during the course of the compression. Thus, obtaining compressed images that satisfy the present file size may be performed more quickly over conventional methods.

Illustrative Operating Environments

FIG. 1 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment for practicing the present invention.

As shown, system 100 of FIG. 1 may represent a camera or any of a variety of other possible portable devices, including video cameras, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to receive and process images, including image sequences. In one embodiment, system 100 may include components not shown, such as a lens or other optical elements, and image sensor(s) for receiving images that may be converted into a digital image for storage within one or more storage devices.

As shown, system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Enhanced Image Processor (EIP) 200, or the like.

Also shown is a volatile random-access memory (RAM) circuit chip 106 that may be coupled to EIP 200 to provide temporary data storage. In one embodiment, RAM 106 may be configured to receive and store image data, such as one or more frames of image data for use by EIP 200 or output data from EIP 200, as well as to store scale factors, BRC curves, cluster data, quantization data, and the like. A separate non-volatile read-only memory (ROM) memory chip 104 is also coupled to EIP 200 and may be employed for storage of a processor program, calibration data, look-up tables (LUTS), non-linear functions, a variety of other data useable by system 100, and the like. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, system 100 may also be configured through Input/Output (I/O) device 108 to access storage devices that may be external to system 100. Thus, it should be understood that EIP 200 may be configured to receive one or more frames of image data, operate upon the received one or more frames of image data to compress the data, and store or otherwise send a resulting compressed (encoded) bit-stream of data using a variety of storage devices, and/or communication mechanisms, and therefore is not limited to merely those described herein.

I/O device 108 includes circuitry for coupling system 100 to one or more external devices, networks or the like, and is constructed for use with one or more communication protocols and technologies, including any of a variety of communication protocols and technologies useable for communicating images, including images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. Further, in one embodiment, the display may also include a touch sensitive screen arranged to receive input from an object such as a stylus or a digit from a human hand.

Also illustrated, is an analog-to-digital converter (A/D) 110 that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). A/D 110 may then provide the digital data to EIP 200 for processing.

Figure 2:
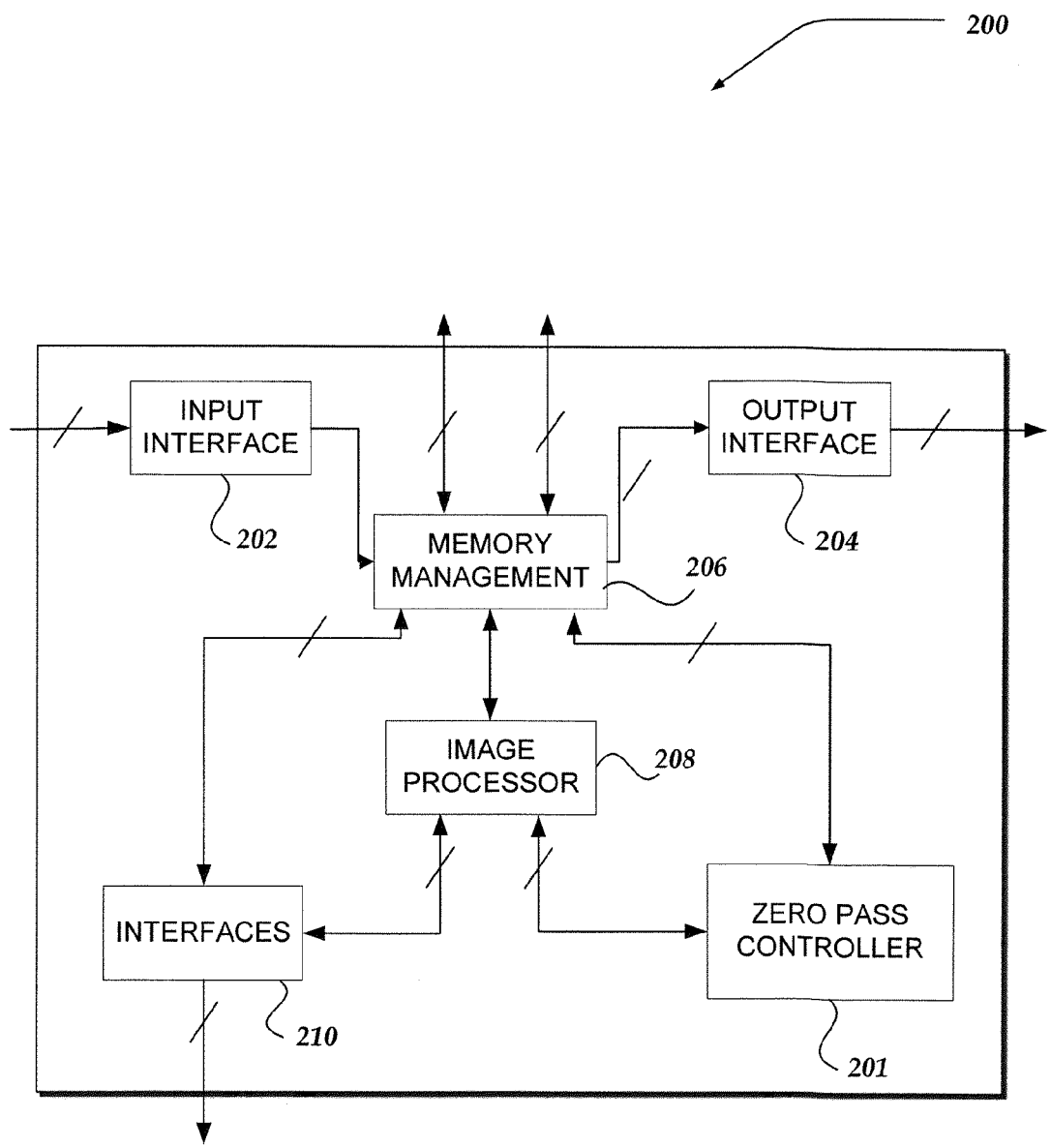
FIG. 2 shows one embodiment of an enhanced image processor usable for practicing various embodiments.

One embodiment of EIP 200 is shown in FIG. 2. EIP 200 may include many more or less components than those shown. The components shown, however, are sufficient to disclose an illustrative embodiment for practicing various embodiments.

As shown in FIG. 2, EIP 200 may include image processor 208 that may represent a general purpose or a specialized computer processing unit (CPU), Programmable hardware units, or any combination that is configured to perform a variety of calculations on an image and/or sequence of images and to control various operations of system 100 in response to computer-readable instructions that may be stored within one of the memory devices of FIG. 1, such as ROM 104, or the like. In one embodiment, digital data of one or more image frames may be received by input interface circuit 202 and communicated to other components by connection through memory management device 206. In one embodiment, Zero Pass Controller (ZPC) 201 may be employed as described further below, to provide encoding (or compression) of an image to a preset file size using statistical information from the image and by initially compressing a subset of the image to determine a scaling factor and BRC curve that is then subsequently used to compress the entire image. The output may then be a compressed bit-stream representing the image that may be output through output interface circuit 204 to various memory storage devices, or even over a network, including, a wireless and/or wired network, to another device. In one embodiment, the compressed image may be stored in a memory device based on the preset file size.

Moreover, in one embodiment, ZPC 201 may be implemented in software that operates within image processor 208. However, in another embodiment, ZPC 201 may represent a hardware component, integrated circuit, or the like, configured to perform actions as described herein.

Interfaces 210 may provide for various mechanisms to communicate with image processor 208 and/or memory management 206, other components, to enable modifications to various actions, provide status of an action, or the like by another device, an end-user, or the like.

Illustrative Network Device

Figure 3:
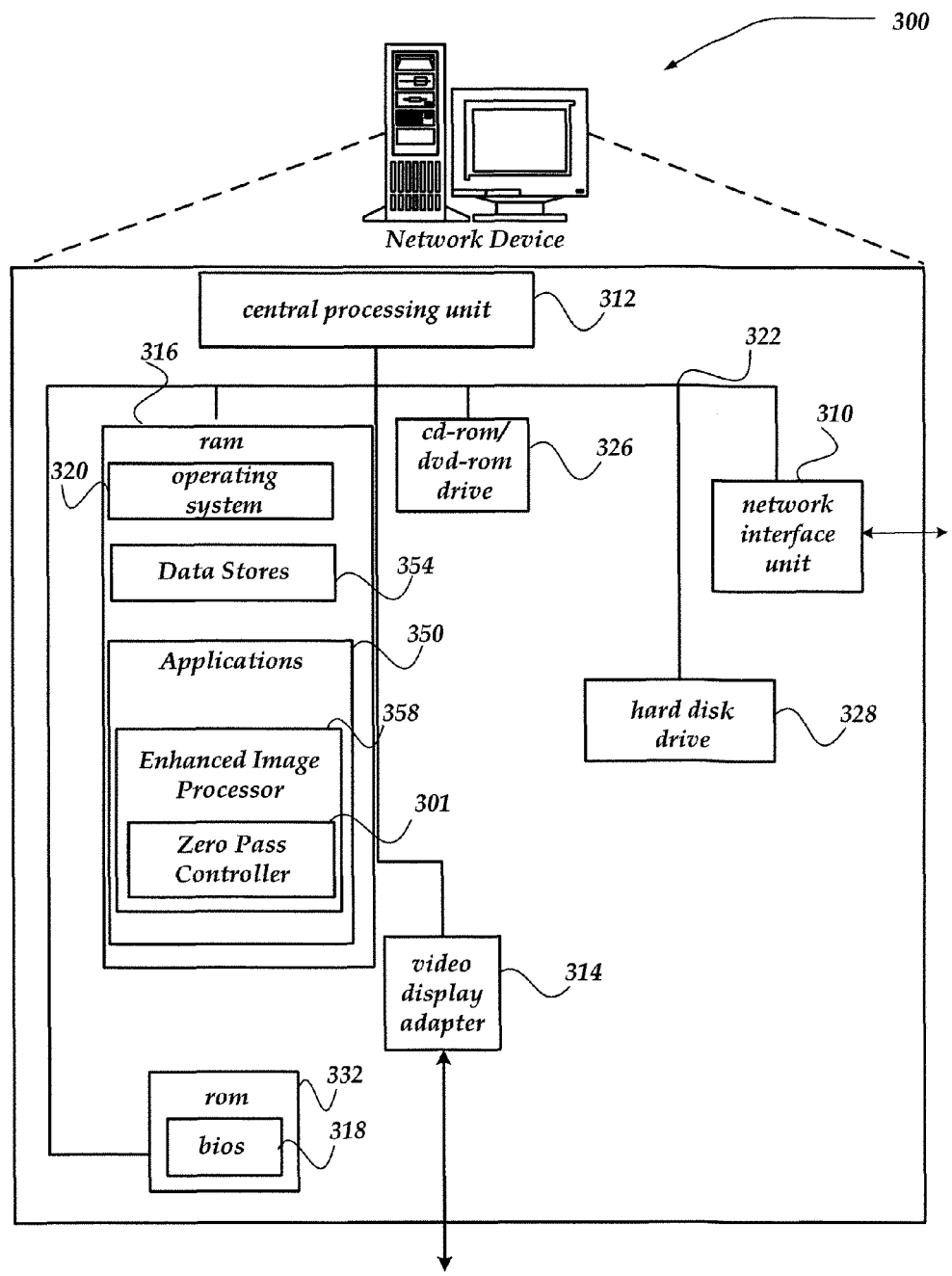
FIG. 3 illustrates a system diagram of another embodiment of an environment in which the embodiments may be practiced.

FIG. 3 shows one embodiment of another device useable with another embodiment of the EIP. Network device 300 may include many more or less components than those shown. The components shown, however, are sufficient to disclose an illustrative embodiment for practicing the invention. Network device 300 may represent any of a variety of computing devices, including, but not limited to personal computers, desktop computers, multiprocessor systems, microprocessor-based or programmable electronics, a rack mounted multi-processing configuration, network PCs, televisions, camera systems, server devices, network appliances, and the like. In one embodiment, while a single network device 300 is illustrated, operations discussed with respect to at least the EIP and/or ZPC, may also be distributed across a plurality of computing devices, for example, such as might arise within a cloud architecture, a peer-to-peer structure, a cluster architecture, or other distributed architectures.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, compact-disc read only memory (CD-ROM)/digital versatile disc-ROM (DVD-ROM) drive 326, and/or floppy disk drive. The mass memory stores operating system 320 for controlling the operation of network device 300. Any general-purpose operating system or special purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable or processor-readable device, namely non-transitory computer-readable storage media. Computer-readable storage media (devices) may include volatile, nonvolatile, non-transitory, removable, and non-removable media implemented in any method or technology for storage of information, such as computer readable instructions, data structures, program modules, or other data. Examples of non-transitory computer-readable storage media include RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device. Moreover, in at least one embodiment, one or more of the memory devices may be configured to employ storage mechanisms that may be based on having a preset file size for images that are to be stored thereon.

As shown, data stores 354 may include a database, text, spreadsheet, folder, file, or the like, that may be configured to maintain and store data useable for Zero Pass Controller (ZPC) 301, including, range data, threshold data, function look-ups, tables, video images, single images, encoded data, reconstructed frame data, reference frame data, motion vectors, one or more frame data, or the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, customizable user interface programs, security programs, and so forth. Memory may also include EIP 358 which may further include ZPC 301. It should be recognized that while EIP 358 and ZPC 301 are illustrated within RAM 316, other embodiments may include EIP 358 and/or ZPC 301 within ROM 332, and/or within one or more separate circuit boards (not shown) within network device 300.

EIP 358 and ZPC 301 operate substantially similar to EIP 200 and ZPC 201 of FIGS. 1-2, respectively, to provide for encoding (or compression) of an image using statistical information from the image and by compressing a subset of the image to obtain a scaling factor and BRC curve, as described in more detail below.

It should be recognized that EIP 358 and ZPC 301 may operate on image data obtained from data stores 354, hard disk drive 328, cd-rom/dvd-rom drive 326, other storage devices, or even from a network or from another device through network interface unit 310, as well as from various image sensing devices, or the like.

Generalized Operation

The operation of certain aspects of the invention will now be described with respect to FIGS. 4-12. The operations of the processes described below may, in one embodiment, be performed within EIP 200 and/or ZPC 201 of FIGS. 1-2, and/or within EIP 358 and/or ZPC 301 of FIG. 3. For example, in one embodiment, blocks 413, 406, and 410 may be performed by image processor 208 of FIG. 2, while blocks 402, 403, 404, 407, 408, and 409 might be performed within ZPC 201 of FIG. 2. However, it should be understood that other arrangements are also envisaged, and thus, embodiments are not constrained to a particular arrangement of the process shown in FIG. 4, or which components within FIGS. 1-3 perform such operations.

Figure 4:
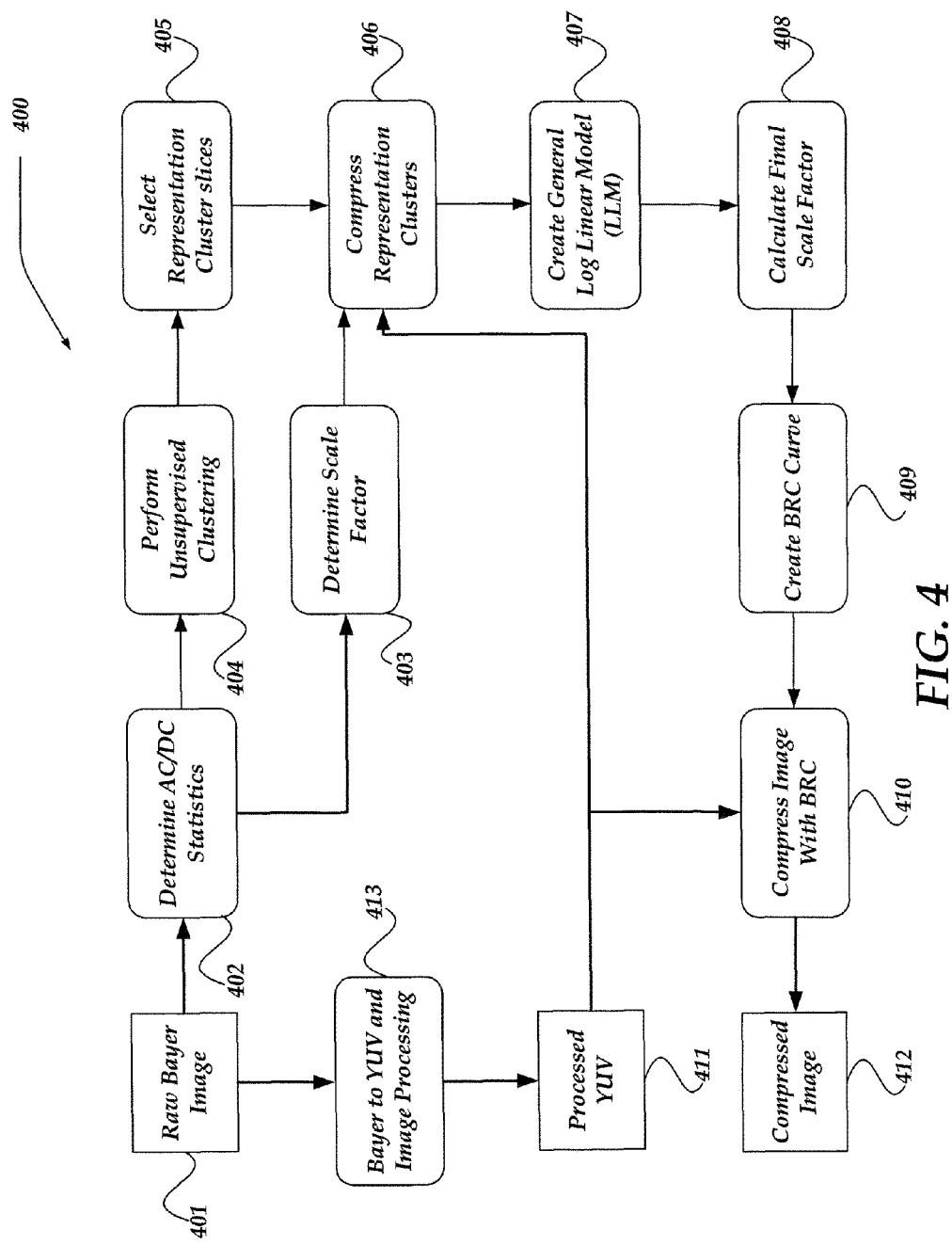
FIG. 4 illustrates one embodiment of a process usable to perform Zero Pass Compression with Bit Rate Control.

Process 400 of FIG. 4 begins at block 402, wherein raw Bayer image data is received from block 401. Block 401 is illustrated as representing the raw Bayer image data.

Prior to discussing how various embodiments of the EIP/ZPC operate, it may be of interest to first discuss how an image may be received and prepared for processing in one embodiment.

Figure 11:
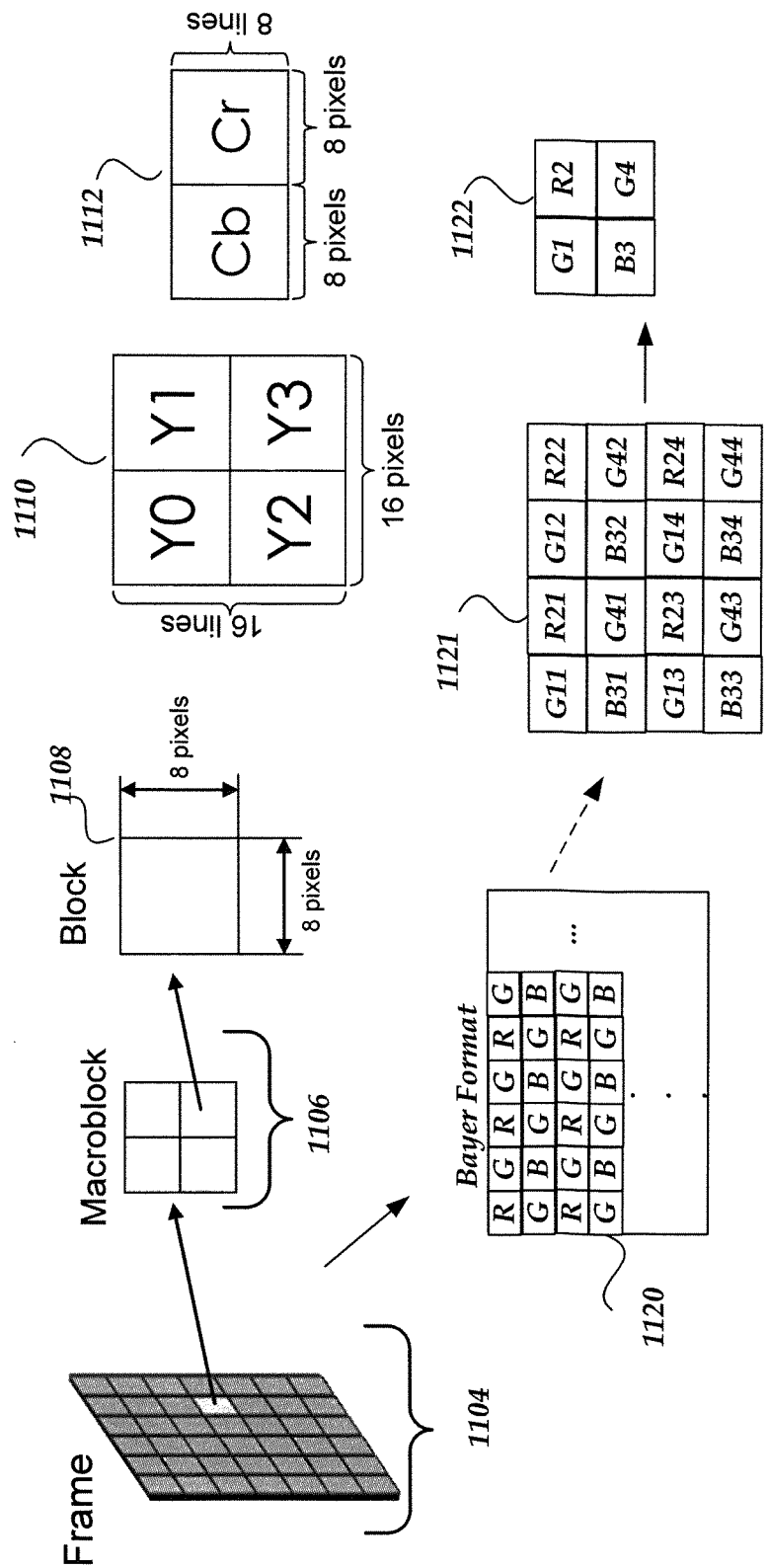
FIG. 11 illustrates one non-limiting, non-exhaustive example of f a decomposition of an image frame for a sample sub-block of a Macro-Block, using a Bayer Format, and a YUV format.

Jumping briefly to FIG. 11, FIG. 11 illustrates one non-limiting, non-exhaustive representation of an image. In one embodiment, an image may be a single frame within a plurality of images. As used herein, the term frame therefore may also represent a single image, or a single image within a sequence of images. In any event, frame 1104 may be coded using any of a variety of mechanisms including those defined by the Joint Video Team (JVT) of the ISO/IEC Moving Picture Expert Group (MPEG) and the ITU-T Video Coding Experts (VCEG). However, it should be understood that embodiments discussed within are not constrained to a particular type of coding mechanism, and any of a variety of other formats, standards, or the like, may also be used. In any event, as shown, frame 1104 (or any other frame) may be divided into a set of pixel arrays, such as 16×16 pixels in size, and each pixel array may then be termed a Macro-Block (MB), such as MB 1106. In one embodiment, a Macro-Block may also be referred to as a Minimal Codec Unit (MCU). It should be recognized that other pixel array sizes may also be employed, including for example, 8×8, 64×64, or even pixel arrays where a number of rows are different from a number of columns within the pixel array. In any event, as is further illustrated in FIG. 11, each MB 1106 may be further divided into a plurality of blocks. As shown, one non-limiting example of a block, Block 1108, illustrates that MB 1106 is divided into four blocks, each of 8×8 pixels. However, other sizes of blocks may also be selected.

In one embodiment, frame 1104 may be obtained from an analog source, and be represented by red (R), green (G), and blue (B) lines that may be converted into color difference components using, for example, various processes. For example, in one embodiment, such color difference components may be obtained based on the Rec. 601 (formally known as the CCIR-601) component color television standard from the International Telecommunication Union (ITU) Radio communication Sector (ITU-R). However, any of a variety of other techniques may also be employed, and embodiments are not constrained to a particular standard, or format. In any event, by way of example only, the image data may be defined by three components of the image signal; namely, a luminance component (Y), and two complementary chrominance (color differences) components (V=R−Y) and (U=B−Y). For three dimensional or higher dimensional images, and/or other types of image representations, other components may also be included.

In this example, each image sub-block (block 1108) may be formed of a given number of pixels of the image. A Y block 1110, may comprise 16 pixels horizontally and 16 lines of pixels vertically. Where the image data includes a color signal, then the image sub-blocks (block 1108) further include color information in the form of chrominance components, Cb and Cr, where Cb and Cr are the blue-difference (U) and red-difference (V) components, respectively. Each of the color components may be represented by respectively superimposed color blocks 1112.

Various mechanisms may be employed to convert the RGB data signals into color difference components, including for example using a matrix circuit to provide the luminance (Y), and chrominance (Cb, Cr) component signals. In one embodiment, the luminance component and the chrominance components may be received as analog signals that are provided to respective low pass (or equal bandwidth) filters and passed through analog-to-digital converters, to generate a digital data format. In one embodiment, the filtered and digitized luminance and chrominance components may be supplied to a block forming circuit, in one embodiment, where the described image blocks may be formed.

Also illustrated in FIG. 11 is another format for representing frame 1104, called the Bayer Format. In at least one embodiment of the Bayer Format shown in formatted block 1120, half of the total number of pixels are green (G), while a quarter of the total number are assigned to both red (R) and blue (B). Block 1121 represents an extracted subset of formatted block 1120.

Frame 1104 described above and in FIG. 4 may be provided to the EIP/ZPC to perform zero pass compression using a BRC curve. In one embodiment, frame 1104 may be provided in real-time. However, in another embodiment, frame 1104 may be stored on various storage devices, such as those disclosed above.

Turning next to operations of the EIP/ZPC, FIG. 4 illustrates one embodiment of a process for performing zero pass compression using bit rate control based on a BRC curve. Process 400 of FIG. 4 may include many more or less components than those shown. The components shown, however, are sufficient to disclose an illustrative embodiment for practicing the invention.

In one embodiment of FIG. 4, the input image may be received as raw Bayer formatted image data, shown as raw Bayer image 401. In one embodiment, the raw Bayer image 401 may be converted to YUV formatted image data, in block 413 as discussed above. Block 411 represents the output of block 413, the processed YUV image data.

Block 402 of process 400 may use the raw Bayer image data 401 as input to determine AC/DC statistics for the image. However, in another embodiment, block 402 may also be configured to use as input the YUV formatted image data, such as processed YUV data of block 411.

Figure 5:
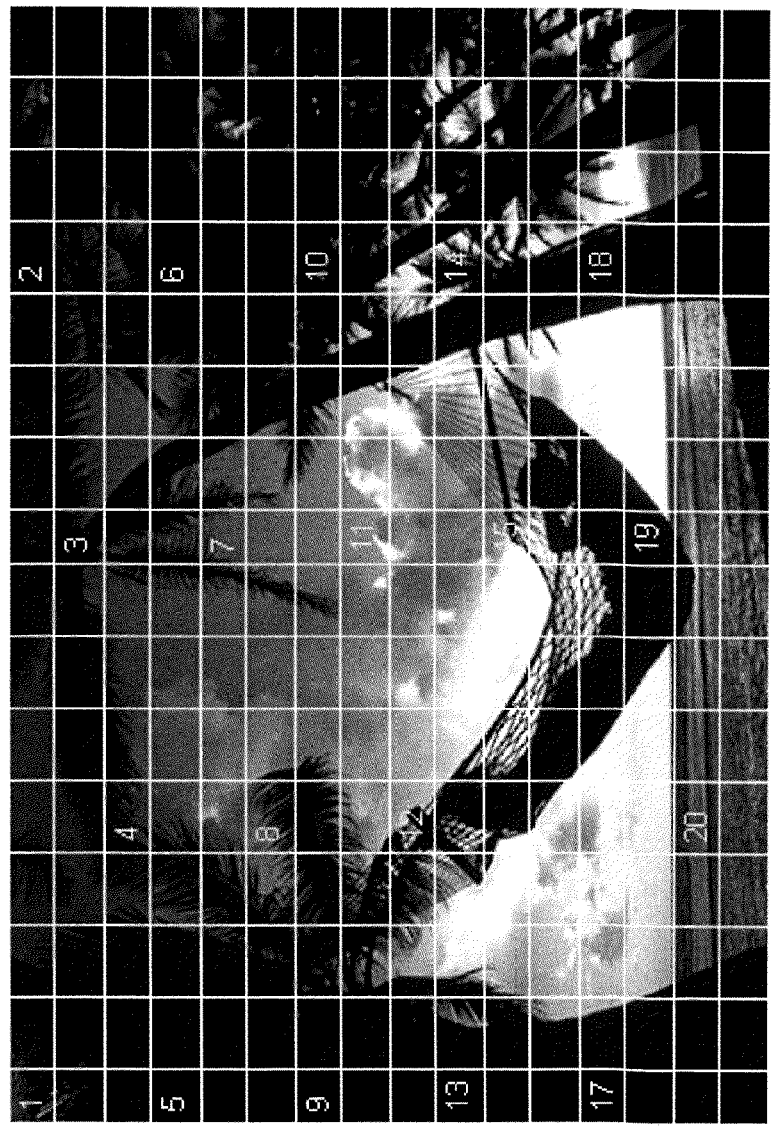
FIG. 5 illustrates one non-limiting, non-exhaustive example of an image divided into blocks and rows.

In any event, the input, such as raw Bayer image 401, may be divided into blocks and rows, where the blocks are termed as slices. One non-limiting, non-exhaustive example of an image 500 that is shown as being divided into a plurality of slices is seen in FIG. 5. In one embodiment, AC and DC components may be estimated using specialized hardware units separately for each slice. In one embodiment, the AC component of image 500 represents the high frequency spatial components for image 500, while the DC components represent the low frequency spatial components of image 500.

In one embodiment, statistics for the AC components may be determined for each color in the Bayer colors (R, G, and B) separately, for each sub-window (slice). For example, in one embodiment, the following calculations may be performed:

$$AC\_Horizontal\_red = \sum_{y=0}^{SubWindowHeight/2} \sum_{x=0}^{SubWindowWidth/2} |p(x \cdot 2, y \cdot 2) - p(x \cdot 2 - 2, y \cdot 2)|$$

$$AC\_Vertical\_red = \sum_{y=0}^{SubWindowHeight/2} \sum_{x=0}^{SubWindowWidth/2} |p(x \cdot 2, y \cdot 2) - p(x \cdot 2, y \cdot 2 - 2)|$$

where pixels are referred to as p(x, y). The AC statistics for red may then be determined as $$AC\_red = AC\_Horizontal\_red + AC\_Vertical\_red$$

The AC statistics for the green and blue colors (AC_green and AC_blue) are computed in a similar approach. It is noted, however, that other methods may also be used to calculate the AC statistics. In any event, the above AC statistics may be interpreted as an approximation of the high frequency energy in the image (e.g., a first derivative of the pixel resolution).

The DC statistics may be calculated, in one embodiment, using a down scaled version of the Bayer formatted image. Referring briefly to FIG. 11, extracted block 1121 of the Bayer formatted block 1120 of frame 1104 represents a scaled down block using a selected scaling factor. As shown, scaled block 1122 is scaled down by one-fourth. As shown:

$$G1 = G11 + G12 + G13 + G14$$

$$R2 = R21 + R22 + R23 + R24$$

$$B3 = B31 + B32 + B33 + B34$$

$$G4 = G41 + G42 + G43 + G44$$

However, other scaling factors may also be used.

The DC statistics may then be determined for each color of the Bayer colors (R, G, and B) separately using the following equation for each sub-window (slice).

$$DC\_red = \sum_{y=0}^{SubWindowHeight/2} \sum_{x=0}^{SubWindowWidth/8} |\cdot p(x \cdot 2, y \cdot 2) - \cdot p(x \cdot 2 - 2, y \cdot 2)|$$

where, the down scaled pixels are referred to as p(x, y). The DC statistics of the green and blue colors (DC_green and DC_blue) may be calculated in a similar way. Again, it is noted that other equations may also be used to determine the DC components for the Bayer colors.

The above DC statistics may be interpreted as an approximation of the low frequency energy in the image (e.g., a first derivative of the low resolution of the image). However, higher derivative statistics may also be used for the DC and AC components.

The overall AC and DC statistics may then be computed as weighed sum at block 402 of FIG. 4 by:

$$AC = W_{AC\_red} * AC\_red + W_{AC\_green} * AC\_green + W_{AC\_blue} * AC\_blue$$

$$DC = W_{DC\_red} * DC\_red + W_{DC\_green} * DC\_green + W_{DC\_blue} * DC\_blue$$

where W refers to the various weights.

Continuing with process 400 of FIG. 4, the AC/DC statistics may be provided to blocks 403 and 404 to determine an initial scale factor, and to perform an unsupervised clustering over the image, respectively.

At block 404, the AC/DC statistics may be used to segment the slices of the image (shown in FIG. 5) into K segments that are similar to each other in AC and DC activity. The slices may be grouped into segments by applying, in one embodiment, an unsupervised clustering method. One method that may be used is known as the K-means clustering or centroid-based clustering method. In these methods, clusters are represented by a central vector, which may not necessarily be a member of a data set. When the number of clusters is fixed to K, the K-means clustering provides a formal definition of an optimization problem of finding k cluster centers and assigning objects/slices to the nearest cluster center, such that the squared distances from the cluster are minimized. K-means is known as a hard clustering approach where an object/slice is determined to belong to a cluster or not. It is noted that other clustering methods may also be used.

One embodiment for performing the clustering in block 404 may be described as follows. A slices index may be generated in a "raster order," starting from an uppermost left-hand corner of the image, and progressing across rows from left to right. The AC and DC statistics of all of the slices may then be organized in a vector array, where each slice in the image has its corresponding AC/DC statistics, according to the corresponding slice index:

AC_DC [0: NumOfSlices−1] [0:1]

For each array entry, a first memory location contains a corresponding slice's AC statistics, and a second memory location contains the slice's DC statistics.

Then, the number of clusters, K, is selected. In one embodiment, the value of K may be selected based on a variety of performance requirements, including speed of convergence, quality of results, as well as based on engineering judgment, historical data, or the like. In one embodiment, K may be selected between 4-25; however, other values may also be used.

A vector that includes for each cluster and contains the representative AC/DC statistics may be defined as:

ClusterCentroids [0:K−1] [0:1]

Further, the following vector may be defined to contain for each slice, the cluster index to which the slice belongs:

IDX [0: NumOfSlices−1]

An initial value of the ClusterCentroids vector with AC/DC statistics of the slices may be set, evenly placed at every Nth slice raster order-wise, where N=Round down (Number of slices/K).

Referring briefly to FIG. 5, the image 500 illustrates 256 slices (each block), with a number of clusters (K) as 20. As shown then, the initial points may be placed along the rows at a spacing of 256/20 rounded to every $12^{th}$ slice, starting from the uppermost left-hand corner. The numbers shown in image 500 illustrate the initial points.

Continuing the computations of block 404, the distance for each slice form the cluster representatives as:

$$d(m,n) = abs(AC\_DC[m]/[0] - ClusterCentroids[n]/[0]) + abs(AC\_DC[m]/[1] - ClusterCentroids[n]/[1])$$

for:

$$\forall m \in [0, NumOfSamples-1] \text{ and } \forall n \in [0, K-1]$$

For each slice the cluster index to which it belongs may then be found according to the minimum distance from cluster representatives:

$$IDX[m] = \arg\min_n \{d(m, n)\}$$

for: $\forall n \in [0, K-1]$ where the arg min provides the index n which results with the min value.

The number of members in each cluster is given by:

$$ClusterCount[n] = \sum_{if\ n=IDX[m]} 1$$

For: $\forall m \in [0, NumOfSamples - 1]$

The cluster centers may be updated by calculating the mean of the updated member of each cluster, per AC and DC component, as:

$$ClusterCenters[n] = \sum_{if\ n=IDX[m]} AC\_DC[m] \bigg/ \sum_{if\ n=IDX[m]} 1$$

For: $\forall m \in [0, NumOfSamples - 1]$

Further, the sum of distances from the cluster centers may be calculated as:

$$\sum_{m=0}^{NumOfSamples-1} d(m, IDX[m])$$

The above equations may be repeated at least twice, or until (Previous_SumOfDist − SumOfDist)/SumOfDist < Threshold where Threshold may be selected based on a desired confidence of the clustering result.

Figure 6:
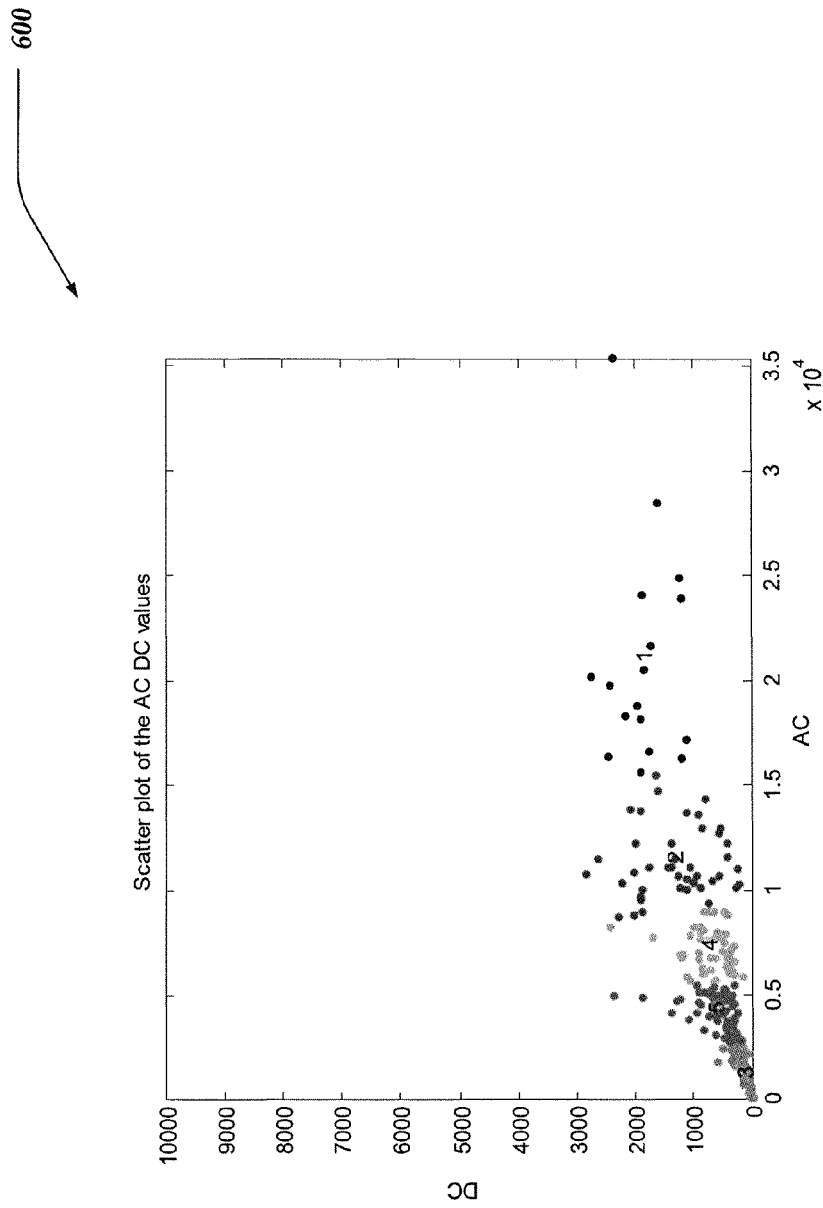
FIG. 6 illustrates one non-limiting, non-exhaustive example of a K-means clustering plot.

Turning briefly to FIG. 6, one non-limiting, non-exhaustive example of a K-means clustering plot is illustrated for K=5. In this example, the spacing between initial points is 51.

Returning to process 400 of FIG. 4, processing may then proceed to block 405 where a representative cluster slice is selected for the clusters determined from block 404.

The cluster segment representatives for the K groups may then be given as:

$$Representative\_IDX[n] = \arg_i \min [d(i,n)]$$

for: $\forall i \in [0:NumOfSamples-1]$.

Figure 7:
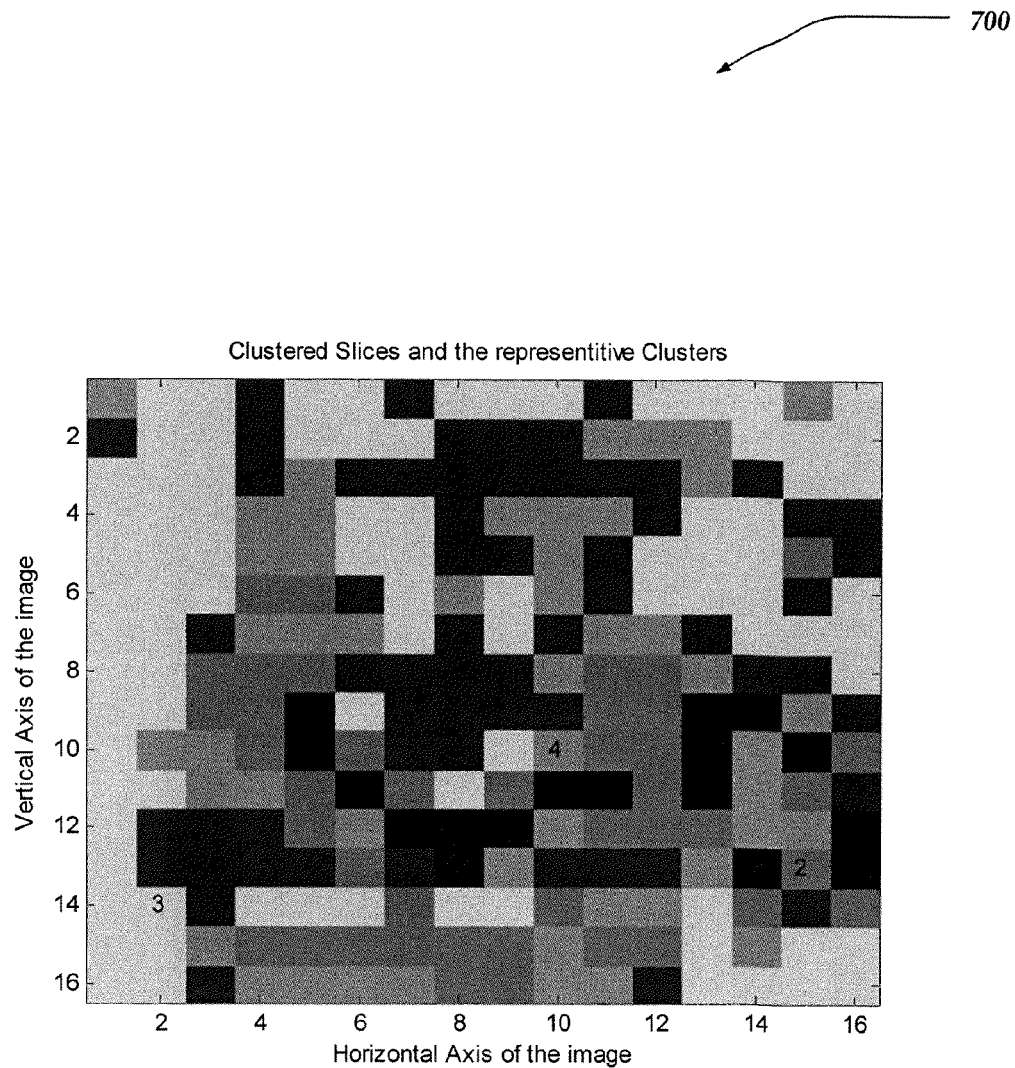
FIG. 7 illustrates one non-limiting, non-exhaustive example of clustered slices for the image with representative clusters identified.

In one embodiment, after clustering in the AC/DC domain, the members may be mapped back onto the sectioned image, such as illustrated in FIG. 7. As shown, the five different clusters from FIG. 6 are annotated differently.

The representation cluster slices may be selected ideally to represent the entire image, and to provide estimates on what scale factor to use for the entire image, as well as how the BRC curve appears. As shown in FIG. 7, the numbered slices indicate one embodiment of representative slices.

As noted above, the initial scale factor is determined at block 403 of FIG. 4. In one embodiment, the initial scale factor may be determined concurrently, while block 404 is being performed, before block 404, or even after block 404 is performed.

In any event, in one embodiment, at block 403, the initial scale factor may be determined based on the AC statistics determined from block 402, and a desired compression ratio (CR). For example, in one embodiment, the initial scale factor may be obtained from a look-up table (LUT), such as illustrated in the non-limiting non-exhaustive LUT 1000 of FIG. 10. In one embodiment, two factors may be used to determine the initial scale factor. The first factor may be desired Bits Per Pixel (BPP) or CR, and the second is an average AC activity in the image. It is noted however, the initial scale factor may also be determined using non-linear equations, curves, or the like, and need not employ LUTs.

Figure 10:
FIG. 10 illustrates one non-limiting, non-exhaustive example table usable to determine scale factors.

As an example, looking briefly to LUT 1000 of FIG. 10, for a desired BPP of 1.33, and an average AC activity of 1300 for the Bayer image, the initial scale factor may be determined as 24. It is noted however, that the values of LUT 1000 are merely representative of possible scale factors for a given image compression, such as an 8-bit Bayer format, for a YUV422 compressed image. Thus, the values may be different based on other configurations. Moreover, where the compressed image is a scaled version of the Bayer image, then the statistics should be done on a scaled version of the Bayer and a different initial scale factor, and/or LUT might be used.

Returning to process 400 of FIG. 4, having obtained the representative cluster slices, and initial scale factor, processing flows to block 406. It is noted, that in one embodiment, processed YUV image 411 may be used as input to block 406. At block 406, the K-representation slices are compressed using, in one embodiment, JPEG, with the initial scale factor.

That is, each cluster representative is compressed and the result of the bitstream size may be stored in a vector Representative_stream_size[n] providing the size in bits.

The BPP for the cluster representative may be given by:

BPP[n] = Representative_stream_size[n]/input_image_number_pixels

The results of the compression are then used to calculate a weighted average Compression Ratio or the equivalent inverse BPP. That is, the average BPP is a weighted sum of the representative BPP and is given by:

Average_BPP = ΣBPP[n]*ClusterCount[n]/ΣClusterCount[n]

for:

$$\forall n \in [0, K-1]$$

The average CR can be determined as:

Average CR=$YUV$_image_BPP/Average_BPP

Weights may be set according to the relative size of each segment relative to the total number of slices. The scale factor may then be adjusted according to a degree of over/undershoot of a target BPP. For example, where the compression is of the YUV image, the result with a target_bitstream_size is then:

Target_CR=$YUV_{image}$_size/target_bitstream_size

And, the target_BPP is then determined as:

Target_BPP=$YUV$_image_BPP/Target_CR

The representation slices are then compressed again using the adjusted scale factor. Again, using the equations above, the weighted average of the BPP is calculated. The first and second sets of scale factors and resulting average BPP values may then be used at block 407 of process 400 of FIG. 4 to create a log linear model (LLM) that provides an approximation of:

BPP=function(Scale factor)

where the log linear model may be defined as:

$$\log_2 y = a \log_2 x + b$$

While the above equation uses the base of two, other bases may also be used. The following system of linear equations may then be used based on values of scale factors and BPPs obtained from block 406:

At block 407 the following equations may then be solved to determine the parameters A[n] and B[n] for each representation slice.

$$\log_2 BPP_1[n] = A[n] \log_2 SF_1 + B[n]$$

$$\log_2 BPP_2[n] = A[n] \log_2 SF_2 + B[n]$$

For the global case, the BPP may be represented by the Average_BPP as determined above and the following equations may then be solved to determine the global parameters A and B $$\log_2 \text{Average\_BPP}_1[n] = A \log_2 SF_1 + B$$

$$\log_2 \text{Average\_BPP}_2[n] = A \log_2 SF_2 + B$$

Figure 8:
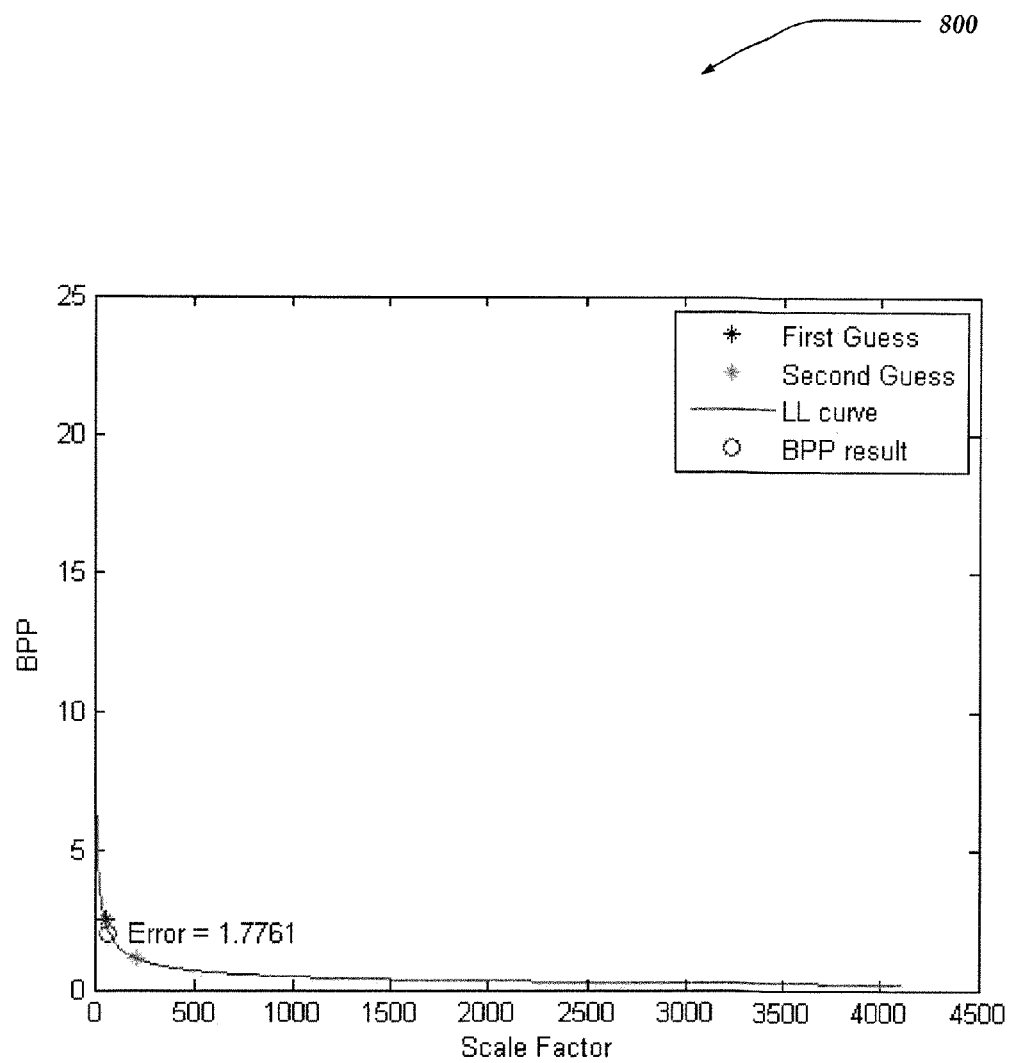
FIG. 8 illustrates one non-limiting, non-exhaustive example curve for determining a scale factor.

Briefly, FIG. 8 illustrates one non-limiting, non-exhaustive example curve 800 for determining a scale factor derived from the LLM above for parameters A and B.

Proceeding to block 408 of FIG. 4, the following may then be used to calculate a final scale factor for the entire image, based on the compression analysis above for a subset of the entire image:

$$SF_{final} = \text{pow}(2, (\log_2 BPP_{target} - B)/A)$$

The individual MCUs (Minimal Codec Units) of the YUV image may be mapped onto the slices. Where there is a mismatch in image slice sizes, and MCU sizes, an MCU might not fall nicely within a slice. Thus, for those MCUs that fall on edges between slices are assigned, in one embodiment, either by where an upper right hand corner falls, or by where a largest intersection in the area between the slice and MCU is found. Other approaches may also be used. This mapping is performed to know the number of bits to take for each MCU for the construction of the BRC curve described further below.

With the above LLM for each representation slice, the expected BPP for each representation slice may also be determined as:

$$BPP_{RepSlice}[n] = \text{pow}(2, (A[n] * \log_2 SF_{final} + B[n]))$$

for $\forall n \in [0, 1-K]$.

Further, the $BPP_{RepSlice}(n)$ represents the BPP of each representation slice, and the parameters A[n] and B[n] are used to calculate the target BPP for each cluster, using the above. It may be assumed that each slice has the same BPP as its representation slice and this may then be used to calculate the BRC curve.

Figure 9:
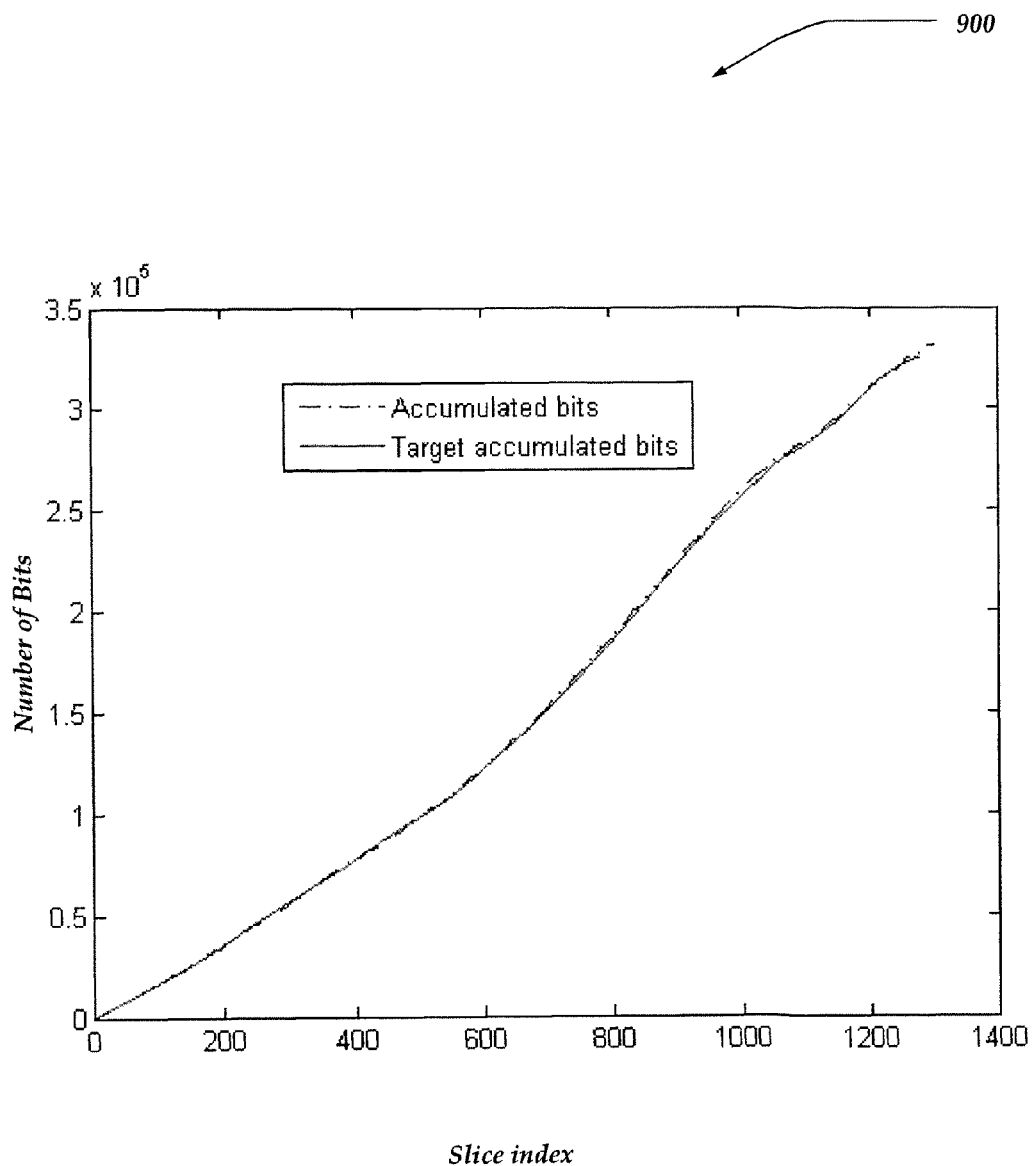
FIG. 9 illustrates one non-limiting, non-exhaustive example of a Bit Rate Control (BRC) curve.

Process 400 next flows to block 409, where the BRC curve is created. FIG. 9 illustrates one non-limiting, non-exhaustive example of a Bit Rate Control (BRC) curve that may be created based on the computations discussed above. As shown, in one embodiment, the BRC curve may be generated by accumulating the BPP of the slices according to increasing slice index ("raster" order).

Continuing to block 410, using the final scale factor from block 408, and the BRC curve of block 409, the entire image may then be compressed. As discussed above, the image that is compressed may be compressed using the JPEG compression/encoders. In one embodiment, the YUV image after being converted from the Bayer image format and having undergone any additional image processing may be used as the input to block 410.

Along with compressing the image using the final scale factor, block 410 also is configured to monitor the JPEG encoder for possible overflows in bits. When the accumulated bits exceed the bits set by the BRC curve of block 409, a private quantizer technique may be employed to effectively increase the effective scale factor for a specific MCU. The affect of the private quantizer is that fewer bits may be used to encode an MCU without modifying the scale factor.

Figure 12:
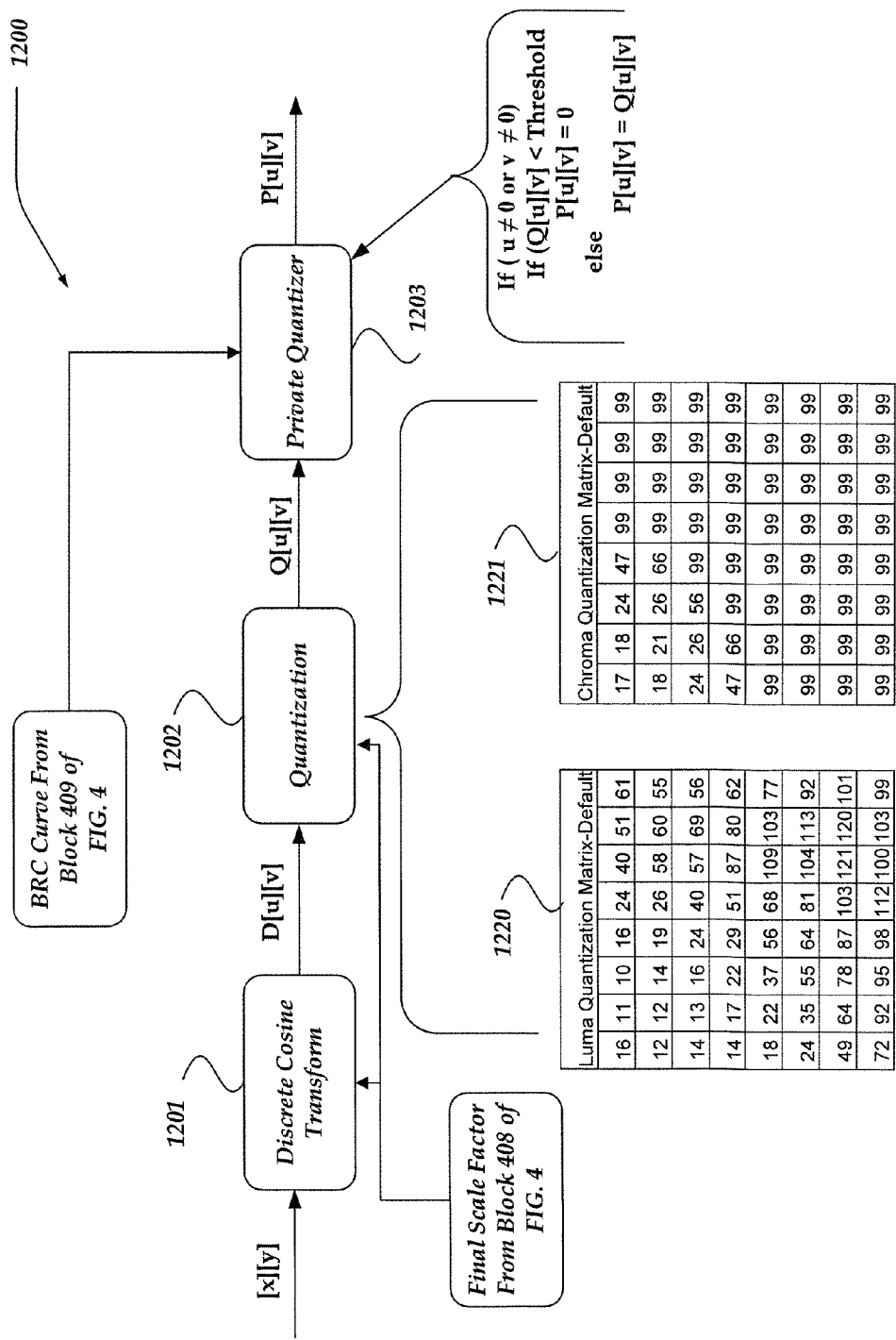
FIG. 12 illustrates one embodiment of an expansion of Block 410 of FIG. 4 using a private quantizer.

FIG. 12 illustrates one embodiment of an expansion of Block 410 of FIG. 4 using a private quantizer. Process 1200 of FIG. 12 may include many more or less components than those shown. The components shown, however, are sufficient to disclose an illustrative embodiment for practicing the invention.

As shown in process 1200, the input to block 1201 may be an MCU from the processed YUV of block 411 of FIG. 1. In one embodiment, the MCU may be an 8×8 block of each component (Y, Cb, Cr), as discussed above. At block 1201 a MCU block (shown as (x,y)) may be converted to a frequency-domain representation, using a normalized, two-dimensional type-II discrete cosine transform (DCT). In one embodiment, prior to computing the DCT of the MCU block, its values may be shifted, from a positive range to one centered around zero. This action may reduce dynamic range requirements in the DCT processing stage. A transformation is then performed on the resulting matrix, providing DC and AC coefficients for the MCU block. In one embodiment, the final scale factor is used to scale the resulting output matrix.

Processing then flows to block 1202 where quantization is performed. In one embodiment, the quantization may be performed using default quantization matrices for the luma (Y) and chroma (C) components, as defined by the JPEG Standard (and available from ISO/IEC IS 10918-1 ITU-T Recommendation T.81), examples of which are illustrated in FIG. 12 as tables 1220-1221. Each quantization matrix component is multiplied by the scaling factor and result is used to divide (quantize) the corresponding DCT coefficient of the MCU.

The output of the quantization block 1202 then is input to private quantizer 1203, along with the BRC curve from block 409 of FIG. 4. As noted above, the BRC curve is monitored, and when the accumulated bits are determined to exceed the BRC curve, the private quantizer 1203 is turned on, otherwise, in one embodiment, private quantizer 1203 might operate as a pass-through. However, in another embodiment, private quantizer 1203 might be selectively turned on, based on a rate of change in the accumulated bits for the compressed image portions, where the rate of change is determined to be at a higher slope (higher rate of change) than the BRC curve at a given slice region. That is, if it is determined that the BRC curve is to be exceeded (absent intervention) before the completion of the compression of all MCUs of the image, although it is not currently exceeded, then the private quantizer 1203 may be turned on earlier, or ramped in sooner, to slow down the accumulation of bits, and thereby avoid overshoots earlier in the compression process for the image.

In any event, when block 1203 is activated, all of the AC values ($u \neq 0$ or $v \neq 0$) of the resulting Q[u][v] block are compared against a threshold value. In one embodiment, the DC value ($u=v=0$) may be unchanged. When the AC value is below a threshold, it may be zeroed to reduce small coefficients in the BPP for the block, and thereby maintain a bit rate control consistent with the BRC curve for the image, and thereby prevent overshooting. In one embodiment, the threshold value may be different per each color component. However, in another embodiment, the threshold may be created as a coefficient matrix, such as T[u][v], and thus, be specific to the DCT coefficients.

The output of process 1203 of FIG. 12 is the output of block 410 of FIG. 4, which is the compressed image 412 having been compressed once using the BRC bit rate controller to obtain a compressed image within the preset image size. By managing the AC values, the BRC curve is directed towards preventing the compressed image from significantly overshooting its preset compressed size.

It will be understood that each component of the illustrations of FIGS. 4 and 12, and combinations of components in these illustrations, can be implemented by computer program instructions. These program instructions may be provided to a processor to produce a machine, such that the instructions, which execute on the processor, create means for implementing the actions specified in the flow component or components. The computer program instructions may be executed by a processor to cause a series of operational steps to be performed by the processor to produce a computer-implemented process such that the instructions, which execute on the processor to provide steps for implementing the actions specified in the flow component or components. The computer program instructions may also cause at least some of the operational steps shown in the components of the flows to be performed in parallel. Moreover, some of the steps may also be performed across more than one processor, such as might arise in a multi-processor computer system. In addition, one or more components or combinations of components in the flow illustrations may also be performed concurrently with other components or combinations of components, or even in a different sequence than illustrated.

Accordingly, components of the flow illustrations support combinations of means for performing the specified actions, combinations of steps for performing the specified actions and program instruction means for performing the specified actions. It will also be understood that each component of the flow illustrations, and combinations of components in the flow illustrations, can be implemented by special purpose hardware-based systems, which perform the specified actions or steps, or combinations of special purpose hardware and computer instructions.

What is claimed as new and desired to be protected by Letters Patent of the United States is:

1. A processor based method, comprising:
   receiving a digital image;
   statistically selecting a subset portion of the digital image;
   compressing the selected subset to estimate a scale factor and to create a Bit Rate Control (BRC) curve; and
   using the estimated scale factor to compress the entire digital image once such that the compressed digital image is compressed to a preset compressed size, and the BRC curve is employed during the single compression to prevent overshooting of the preset compressed size.

2. The method of claim 1, wherein statistically selecting a subset comprises:
   partitioning the digital image into a plurality of slices;
   determining for each slice estimates of high frequency and low frequency activity;
   using a clustering mechanism to cluster slices based in part on each slice's estimated high frequency and low frequency activity;
   selecting from the clusters of slices cluster segment representatives as the subset portion of the digital image.

3. The method of claim 1, wherein compressing the selected subset further comprises:
   determining a target Bits Per Pixel (BPP) for the digital image;
   compressing the selected subset portion a first time using a first scale factor;
   determining a first BPP from the compressed selected subset portion;
   determining a second scale factor based on the target BPP and the first BPP;
   compressing the selected subset portion a second time using the second scale factor;
   determining a second BPP from the second compressed selected subset portion; and
   using the first BPP and second BPP and the first and second scale factors to determine the estimated scale factor useable to compress the entire digital image once.

4. The method of claim 1, wherein compressing the selected subset further comprises:
   determining for each slice within the digital image a representative Bits Per Pixel (BPP) based in part on the estimated scale factor and a log linear model; and
   using the representative BPP for each slice generating the BRC curve by accumulating each BPP of the slices according to an increasing slice index.

5. The method of claim 1, wherein employing the BRC curve to prevent overshooting further comprises:
   compressing a slice of the digital image;
   determining an accumulated Bits Per Pixel (BPP) for the compressed digital image based in part on the compressed slice;
   comparing the accumulated BPP to the BRC curve; and
   based on a result of the comparison, selectively activating a private quantizer, wherein the private quantizer is configured to zero a coefficient of an output of a discrete cosine transform after quantization of each block of the single digital image when the coefficient is determined to be less than a threshold value, such that the BPP for the compressed slice is reduced.

6. The method of claim 5, wherein selectively activating the private quantizer further comprising, activating the private quantizer when it is determined that the accumulated BPP for the image digital image will exceed the BRC curve.

7. The method of claim 1, wherein the digital image is in one of a Bayer image format or a YUV image format, wherein Y represents a luminance component and U and V represent chrominance components of the digital image, or an RGB format, wherein R, G and B represents the red, green and blue components respectively.

8. An image system, comprising:
a memory device to receive an image; and
one or more processors that perform actions, including:
receiving a digital image;
statistically selecting a subset portion of the digital image;
compressing the selected subset to estimate a scale factor and to create a Bit Rate Control (BRC) curve; and
using the estimated scale factor to compress the entire digital image once such that the compressed digital image is compressed to a preset size, and the BRC curve is employed during the single compression of the entire digital image to prevent overshooting of the preset size.

9. The image system of claim 8, wherein statistically selecting a subset comprises:
partitioning the digital image into a plurality of slices;
determining for each slice estimates of high frequency and low frequency activity;
using a clustering mechanism to cluster slices based in part on each slice's estimated high frequency and low frequency activity;
selecting from the clusters of slices cluster segment representatives as the subset portion of the digital image.

10. The image system of claim 8, wherein compressing the selected subset further comprises:
determining a target Bits Per Pixel (BPP) for the digital image;
compressing the selected subset portion a first time using a first scale factor;
determining a first BPP from the compressed selected subset portion;
determining a second scale factor based on the target BPP and the first BPP;
compressing the selected subset portion a second time using the second scale factor;
determining a second BPP from the second compressed selected subset portion; and
using the first BPP and second BPP and the first and second scale factors to determine the estimated scale factor useable to compress the entire digital image once.

11. The image system of claim 8, wherein compressing the selected subset further comprises:
determining for each slice within the digital image a representative Bits Per Pixel (BPP) based in part on the estimated scale factor and a log linear model; and
using the representative BPP for each slice generating the BRC curve by accumulating each BPP of the slices according to an increasing slice index.

12. The image system of claim 8, wherein employing the BRC curve to prevent overshooting further comprises:
compressing a slice of the digital image;
determining an accumulated Bits Per Pixel (BPP) for the compressed digital image based in part on the compressed slice;
comparing the accumulated BPP to the BRC curve; and
based on a result of the comparison, selectively activating a private quantizer, wherein the private quantizer is configured to zero a coefficient of an output of a discrete cosine transform after quantization of each block of the single digital image when the coefficient is determined to be less than a threshold value, such that the BPP for the compressed slice is reduced.

13. The image system of claim 12, wherein selectively activating the private quantizer further comprising, activating the private quantizer when it is determined that the accumulated BPP for the image digital image will exceed the BRC curve.

14. The image system of claim 8, wherein the digital image is in one of a Bayer image format or a YUV image format, wherein Y represents a luminance component and U and V represent chrominance components of the digital image, or a RGB format, wherein R, G and B represents the red, green and blue components respectively.

15. An apparatus for encoding image data, comprising:
one or more physical components that receive a digital image; and
one or more circuit units configured to perform actions, including:
receiving a digital image;
statistically selecting a subset portion of the digital image;
compressing the selected subset to estimate a scale factor and to create a Bit Rate Control (BRC) curve; and
using the estimated scale factor to compress the entire digital image once such that the compressed digital image is compressed to a preset size, and the BRC curve is employed during the single compression of the entire digital image to prevent overshooting of the preset size.

16. The apparatus of claim 15, wherein at least one circuit unit also includes a processor.

17. The apparatus of claim 15, wherein statistically selecting a subset comprises:
partitioning the digital image into a plurality of slices;
determining for each slice estimates of high frequency and low frequency activity;
using a clustering mechanism to cluster slices based in part on each slice's estimated high frequency and low frequency activity;
selecting from the clusters of slices cluster segment representatives as the subset portion of the digital image.

18. The apparatus of claim 15, wherein compressing the selected subset further comprises:
determining a target Bits Per Pixel (BPP) for the digital image;
compressing the selected subset portion separately a plurality of times using different scale factors for each separate compression, to calculate for each compression a BPP; and
based on the different scale factors, and calculated BPPs from each compression, creating a log linear model usable to estimate the scale factor for compressing the entire digital image.

19. The apparatus of claim 15, wherein compressing the selected subset further comprises:
determining for each slice within the digital image a representative Bits Per Pixel (BPP) based in part on the estimated scale factor and a log linear model; and
using the representative BPP for each slice generating the BRC curve by accumulating each BPP of the slices according to an increasing slice index.

20. The apparatus of claim 15, wherein employing the BRC curve to prevent overshooting further comprises:
compressing a slice of the digital image;
determining an accumulated Bits Per Pixel (BPP) for the compressed digital image based in part on the compressed slice;
comparing the accumulated BPP to the BRC curve; and based on a result of the comparison, selectively activating a private quantizer, wherein the private quantizer is configured to zero a coefficient of an output of a discrete cosine transform after quantization of each block of the single digital image when the coefficient is determined to be less than a threshold value, such that the BPP for the compressed slice is reduced.

21. The apparatus of claim 19, wherein selectively activating the private quantizer further comprising, activating the private quantizer when it is determined that the accumulated BPP for the image digital image will exceed the BRC curve.

* * * * *